(12) United States Patent
Kobayashi et al.

(10) Patent No.: US 8,936,862 B2
(45) Date of Patent: Jan. 20, 2015

(54) CYLINDRICAL NONAQUEOUS ELECTROLYTE BATTERY

(75) Inventors: Yuta Kobayashi, Fukushima (JP);
Hisashi Tsujimoto, Fukushima (JP);
Masaki Kuratsuka, Fukushima (JP);
Yuzuru Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 13/035,449

(22) Filed: Feb. 25, 2011

(65) Prior Publication Data
US 2011/0217589 A1 Sep. 8, 2011

(30) Foreign Application Priority Data
Mar. 3, 2010 (JP) ................................ P2010-046545

(51) Int. Cl.
*H01M 2/02* (2006.01)
*H01M 2/08* (2006.01)
*H01M 10/02* (2006.01)

(52) U.S. Cl.
CPC *H01M 2/02* (2013.01); *H01M 2/08* (2013.01); *H01M 10/02* (2013.01); *Y02E 60/122* (2013.01)
USPC .......................................................... 429/94

(58) Field of Classification Search
CPC .......... H01M 2/02; H01M 2/08; H01M 10/02
USPC .......................................................... 429/94
See application file for complete search history.

(56) References Cited

U.S. PATENT DOCUMENTS

| 5,491,037 | A | * | 2/1996 | Kawakami ..................... 429/49 |
| 2007/0154787 | A1 | * | 7/2007 | Jang et al. ..................... 429/94 |
| 2007/0196732 | A1 | * | 8/2007 | Tatebayashi et al. ......... 429/181 |
| 2011/0091756 | A1 | * | 4/2011 | Suzuki et al. ................. 429/94 |

FOREIGN PATENT DOCUMENTS

| CN | 1922393 | 2/2007 |
| JP | 6-181058 | 6/1994 |
| JP | 2004-255805 | 9/2004 |
| JP | 2005-059409 | 3/2005 |

(Continued)

OTHER PUBLICATIONS

Chinese Office Action issued Jun. 26, 2014 in corresponding Chinese Patent Application No. 201110045468.9.

(Continued)

*Primary Examiner* — Maria J Laios
(74) *Attorney, Agent, or Firm* — K&L Gates LLP

(57) ABSTRACT

A cylindrical nonaqueous electrolyte secondary battery includes: a wound electrode unit as a wound electrode laminate of belt-like positive and negative electrodes laminated via a separator, the positive electrode including a positive electrode collector and a positive electrode active material layer, and the negative electrode including a negative electrode collector and a negative electrode active material layer; an adhesive member provided to cover the wound electrode laminate at a terminating end portion lying on an outer side of the wound electrode unit; and a battery canister housing the wound electrode unit, the adhesive member including a base material, and an adhesive layer provided on a whole surface or on at least a part of the surface on one side of the base material, and the base material being a mixture of a resin material of high swellability and a resin material of high melting point.

14 Claims, 2 Drawing Sheets

(56) References Cited

FOREIGN PATENT DOCUMENTS

| | | |
|---|---|---|
| JP | 2005-169935 | 6/2005 |
| JP | 2007-184238 | 7/2007 |
| WO | WO 2009/139388 * 11/2009 | ........ H01M 10/0587 |

OTHER PUBLICATIONS

Japanese Office Action issued Jul. 29, 2014 in corresponding Japanese Patent Application No. 2010046545.

* cited by examiner

CYLINDRICAL NONAQUEOUS ELECTROLYTE BATTERY

CROSS REFERENCES TO RELATED APPLICATIONS

The present application claims priority to Japanese Priority Patent Application JP 2010-046545 filed in the Japan Patent Office on Mar. 3, 2010, the entire contents of which is hereby incorporated by reference.

BACKGROUND

This present application relates to cylindrical nonaqueous electrolyte batteries, particularly to cylindrical nonaqueous electrolyte batteries that have high resistance to external impact.

There is a strong demand for long-lasting batteries in response to the constant developments of thin, small, and light-weight portable electronic devices designed for cordless and portable electronic devices such as cellular phones and laptop personal computers. The most common variation of such batteries is the cylindrical lithium ion secondary battery.

Generally, the cylindrical lithium ion secondary battery is constructed from a wound electrode unit and a nonaqueous electrolytic solution, the former being a multi-layer roll of an electrode laminate of a positive electrode, a negative electrode, and a separator sandwiched between the positive electrode and the negative electrode. The positive electrode has a positive electrode active material layer formed on the both sides of a belt-like collector, and the negative electrode has a negative electrode active material layer formed on the both sides of a belt-like collector. In this type of wound battery, an adhesive member is provided at the electrode laminate end portions (the cut end portions of the positive electrode collector, the negative electrode collector, and the separator), specifically, at the terminating end of the electrode roll, so that the electrodes do not become loose. The adhesive member is provided in way that covers the positive electrode end portion and the negative electrode end portion.

The wound electrode end unit with the end portion covered with the adhesive member is inserted into a cylindrical battery canister having an open end. To make the insertion of the wound electrode unit easier, a certain clearance is required between the outer diameter of the wound electrode unit and the inner diameter of the battery canister.

However, in the event where a battery with such a clearance is dropped or subjected to some other external impact such as vibrational impact, the wound electrode unit tends to flow or rotate inside the battery canister. Such movement of the wound electrode unit translates into a force that is exerted on the positive and negative electrode terminals connected to the wound electrode unit. This may cause damage to the welded portion between the positive electrode terminal and the safety valve provided on the battery lid, the welded portion between the negative electrode terminal and the bottom of the battery canister, and the part of the negative electrode terminal attached to the negative electrode collector. Further, fracture or other damage to the positive electrode terminal and/or the negative electrode terminal may lead to breaking in the battery internal circuit. The problem of a flowing wound electrode unit in the canister, and the resulting damage to the welded portions of the electrode terminals that leads to the breaking of the battery internal circuit is also present in rectangular lithium ion secondary batteries, though the electrode assembly is less likely to rotate.

As a method of preventing the rotation or flow of the wound electrode unit as described above, it has been proposed to reduce the clearance between the wound electrode unit and the canister by attaching to the wound electrode unit a material that swells upon absorbing the electrolytic solution. Heat-resistant films are also available that are provided as the laminates of a fluororesin layer and other resins, as proposed in JP-A-2005-169935 (Patent Document 3), JP-A-2005-59409 (Patent Document 4), and JP-A-2004-255805 (Patent Document 5).

SUMMARY

The tapes described in JP-A-6-181058 (Patent Document 1) and JP-A-2007-184238 (Patent Document 2) are problematic, because the generated heat during the high-load charge and discharge or high-load cycle may cause damage and distort the shape of the tape, making the tape no longer functional in the ability to suppress loosening or prevent rotation or flowing. Particularly, Patent Document 1 describes using a tape that has an adhesive layer formed on one side of a resin film, and restraining slack in the wound electrode unit by the adhesion of the adhesive layer until the tape swells and anchors the wound electrode unit. However, when a copolymer that contains vinylidene fluoride-based resin and ethylene or other comonomers such as propylene is used as the resin film, the properties of the vinylidene fluoride-based resin and ethylene, or propylene degrade after the polymerization, because the property of the copolymer differs from that of the material used for the polymerization. It is therefore highly likely that the performance of such tapes would be insufficient in terms of expansion and heat resistance.

The films described in Patent Documents 3, 4, and 5 do not function to suppress slack in the wound electrode unit or prevent rotation or flowing. Further, the fluororesin layer easily detaches from other resin layers, which poses problems in handling when the films are used as terminating tapes that suppress slacking, or causes delamination when the films are dipped in an electrolytic solution.

Accordingly, there is a need for a high-expansion and high-heat-resistance adhesive member that can serve to prevent slack in the wound electrode unit, and to anchor the wound electrode unit in the battery canister.

According to an embodiment, there is provided a cylindrical nonaqueous electrolyte secondary battery including: a wound electrode unit as a wound electrode laminate of a belt-like positive electrode and a belt-like negative electrode laminated via a separator, the positive electrode including a positive electrode collector and a positive electrode active material layer formed on the positive electrode collector, and the negative electrode including a negative electrode collector and a negative electrode active material layer formed on the negative electrode collector; an adhesive member provided to cover the wound electrode laminate at a terminating end portion that lies on an outer side of the wound electrode unit; and a battery canister that houses the wound electrode unit, the adhesive member including a base material, and an adhesive layer provided on a whole surface or on at least a part of the surface on one side of the base material, and the base material being a mixture of a resin material of high swellability and a resin material of high melting point.

According to the embodiment of the application, the resin material of high swellability has a degree of swelling of 5% or more after being dipped in propylene carbonate, and the resin material of high melting point has a melting point of 60° C. or more. In this way, the swellability and heat resistance required of the adhesive member of the embodiment of the application can be obtained at the same time.

In terms of satisfying both swellability and heat resistance, it is preferable that the mixture ratio of the resin material of high swellability and the resin material of high melting point range from 10:90 to 97:3 in terms of a weight ratio.

In terms of anchoring the wound electrode unit by the swelling of the adhesive member, it is preferable that the adhesive member cover at least 10% of the whole area of the outer surface of the wound electrode unit.

According to the embodiment of the application, the adhesive member can prevent an electrode slack in the wound electrode unit, and can anchor the wound electrode unit in the battery canister by the adhesive member swelled with an electrolytic solution.

According to the embodiment of the application, damage or fracture in the positive electrode collector and in the negative electrode collector, or damage at the connected portion of the collectors can be prevented.

Additional features and advantages are described herein, and will be apparent from the following Detailed Description and the figures.

DETAILED DESCRIPTION

Embodiments of the present application will be described below in detail with reference to the drawings.

(1) Configurations of Cylindrical Nonaqueous Electrolyte Battery Components

An embodiment of the application is described below with reference to the accompanying drawings.

(1-1) Configuration of Adhesive Member

The embodiment of the application uses an adhesive member that can prevent slack in a wound electrode unit, and can suppress the flow or rotation of the wound electrode unit in the battery canister of a cylindrical nonaqueous electrolyte battery. The adhesive member is provided on the outer surface of the wound electrode unit, covering the electrode end portion of the wound electrode unit. The electrolytic solution injected after the insertion of the wound electrode unit into the battery canister makes the adhesive member expand, and the adhesive member fills the space between the outer surface of the wound electrode unit and the inner wall of the battery canister in a way that suppresses the flow and rotation of the wound electrode unit that might occur in response to external impact.

Figure 1:
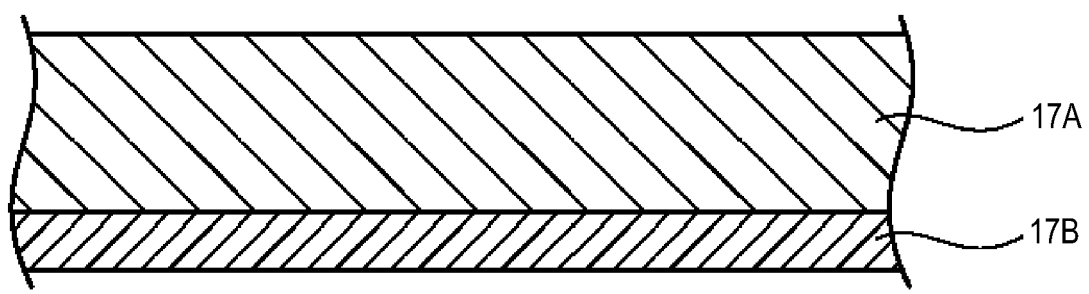
FIG. 1 is a cross sectional view illustrating an example of a configuration of an adhesive member used for the wound electrode unit of a nonaqueous electrolyte battery according to an embodiment of the application.

As illustrated in FIG. 1, an adhesive member 17 according to the embodiment of the application includes a swellable and heat-resistant base material 17A, and an adhesive layer 17B provided on the whole surface or on at least a part of the surface on one side of the base material 17A, and bonded to the outer surface of the wound electrode unit. The base material 17A and the adhesive layer 17B are described below.

Base Material

The base material 17A of the adhesive member 17 is a mixture of a resin material of high swellability (hereinafter, also will be called a "high-swelling resin material" as appro-priate), and a resin material of high melting point (hereinafter, also will be called a "high-melting-point resin material" as appropriate).

Specifically, the high-swelling resin material has a degree of swelling of 5% or more, preferably 11% or more with respect to propylene carbonate (PC). Note that the degree of swelling is a measure of expansion represented by the percentage mass change of a 20-mm diameter material piece of the base material 17A dipped in the dipping solvent propylene carbonate (PC) at a dip temperature of 45° C. for 24 hours, based on JIS K 6258 of the Japanese Industrial Standards. With such materials in this range of degree of swelling, the base material 17A absorbs the electrolytic solution, and swells to the extent sufficient to fill the space between the outer surface of the wound electrode unit and the battery canister.

The high-melting-point resin material has a melting point of 60° C. or more. By using materials having this range of melting point, the base material 17A can be prevented from softening and melting in response to increased battery internal temperatures.

In addition to having a degree of swelling or a melting point of the foregoing ranges, the high-swelling resin material and the high-melting-point resin material have resistance to the electrolytic solution (for example, corrosion resistance).

An example of such high-swelling resin material is a polymeric compound that includes a halogen group, or a polar group such as an ester group and a carboxyl group. Fluorine-based resin material is particularly preferable. For example, such material may be at least one selected from a group of compounds including: copolymers of primarily polyvinylidene fluoride and vinylidene fluoride; polybutadiene; polyisoprene; tetrafluoroethylene-ethylene copolymer (ETFE); tetrafluoroethylene-hexafluoropropylene copolymer (EPE); tetrafluoroethylene-perfluoroalkyl vinyl ether copolymer (PEA); tetrafluoroethylene-hexafluoropropylene copolymer (FEP); and tetrafluoroethylene-hexafluoropropylene-vinylidene fluoride ternary copolymer (THV).

The high-melting-point resin material may be a polymeric material that includes a hydrophobic non-polar group, or a polar group such as an ester group and a carboxyl group. For example, such material may be one selected from a group of compounds including polyethylene (PE), polypropylene (PP), polyimide (PI), polytetrafluoroethylene (PTFE), polyethylene terephthalate (PET), polybutylene terephthalate (PBT), and acryl rubber (ACM).

The high-swelling resin material and the high-melting-point resin material are used as a mixture to exploit their properties for the base material 17A. The mixture ratio of the high-swelling resin material and the high-melting-point resin material preferably ranges from 10:90 to 97:3 in terms of a weight ratio. When the proportion of the high-swelling resin material falls below this range, the base material 17A fails to expand sufficiently, and may not be able to suppress the flow, rotation, or other undesirable movement of the wound electrode unit. When the proportion of the high-melting-point resin material falls below this range, the adhesive member 17 may not be able to sufficiently function to hold the electrode roll in the wound electrode unit in response to temperature increase in the battery.

The base material 17A in the adhesive member 17 may have any thickness, for example, 1 μm or more, generally used in nonaqueous electrolyte secondary batteries. When the base material 17A is too thin, sufficient strength required of the adhesive member 17 may not be maintained. Further, for example, cylindrical nonaqueous electrolyte batteries use a wound electrode unit and a battery canister of large diameters when large current and large capacity are needed. Clearly, different diameters of the wound electrode unit and the battery canister require different clearances. Thus, the thickness of the adhesive member 17 may be set according to the clearance, and the upper limit thickness of the base material 17A is not limited.

Adhesive Layer

The adhesive layer 17B of the adhesive member 17 is provided for the bonding of the base material 17A to the outer surface of the wound electrode unit. The material used for the adhesive layer 17B has good adhesion to both the base material 17A and the outer surface of the wound electrode unit, and an electrolytic solution resistance property.

Examples of such material include: acrylic adhesive such as an acrylic acid ester copolymer; rubber-based adhesive such as natural rubber; silicone-based adhesive such as silicone rubber; urethane-based adhesive such as urethane resin; α-olefin-based adhesive; ether-based adhesive; ethylene-vinyl acetate resin-based adhesive; epoxy resin-based adhesive; vinyl chloride resin-based adhesive; chloroprene rubber-based adhesive; cyanoacrylate-based adhesive; aqueous polymer-isocyanate-based adhesive; styrene-butadiene rubber-based adhesive; nitrile rubber-based adhesive; nitrocellulose-based adhesive; reactive hotmelt-based adhesive; phenol resin-based adhesive; modified silicone-based adhesive; polyamide resin-based adhesive; polyimide-based adhesive; polyurethane resin-based adhesive; polyolefin resin-based adhesive; polyvinyl acetate resin-based adhesive; polystyrene resin solvent-based adhesive; polyvinyl alcohol-based adhesive; polyvinyl pyrrolidone resin-based adhesive; polyvinyl butyral resin-based adhesive; polybenzimidazole-based adhesive; polymethacrylate resin-based adhesive; melamine resin-based adhesive; urea resin-based adhesive; and resorcinol-based adhesive.

The adhesive layer 17B preferably has a delamination strength of 0.1 N/mm or more with respect to the base material 17A, because it helps prevent the adhesive layer 17B from being detached from the base material 17A. Generally, the adhesive member 17 is wound into a roll with the surface of the adhesive layer 17B being attached to the outer surface of the base material 17A on the inner side of the adhesive member 17, or to other sheets such as release paper. The battery manufacturing steps include detaching the base material 17A from the roll of the adhesive member 17 or from the release paper, and thus the delamination strength holding the base material 17A and the adhesive layer 17B should be sufficient, because when it is weak, detachment may occur and battery productivity suffers.

As described above, the adhesive member 17 as the laminate of the base material 17A and the adhesive layer 17B is preferably provided to cover the electrode end portion of the wound electrode unit, covering from 10% to 100%, inclusive, of the outer surface area of a wound electrode unit 20. When the area covered by the adhesive member 17 falls below this range, the expansion effect of the adhesive member 17 for the clearance between the wound electrode unit and the battery canister becomes small, and the flow and rotation of the wound electrode unit may not be prevented, though the expansion effect of the adhesive member 17 itself may be sufficient.

Note that, because the adhesive member 17 suppresses roll slack by being attached to the end portion of the electrode laminate, the adhesive member 17 is preferably provided over the distance substantially equal to the height of the wound electrode unit 20, specifically the width along the shorter side of the electrode laminate, or over a region slightly shorter than this distance. Provided that the adhesive member 17 is provided this way, it is preferable that the adhesive member 17 covers 10% to 100%, inclusive, of the outer surface area of the wound electrode unit 20 at the end portion of the electrode laminate. Depending on the attached position and the shape of the adhesive member 17, the adhesive member 17 can suppress roll slack only by covering, for example, at least 10% of the region along the height of the wound electrode unit 20 at the end portion of the electrode laminate. Thus, the adhesive member 17 may be provided in a region at the end portion of the electrode laminate in a way that suppresses slack and covers 10% to 100%, inclusive, of the outer surface area of the wound electrode unit 20.

(1-2) Configuration of Cylindrical Nonaqueous Electrolyte Battery

Figure 2:
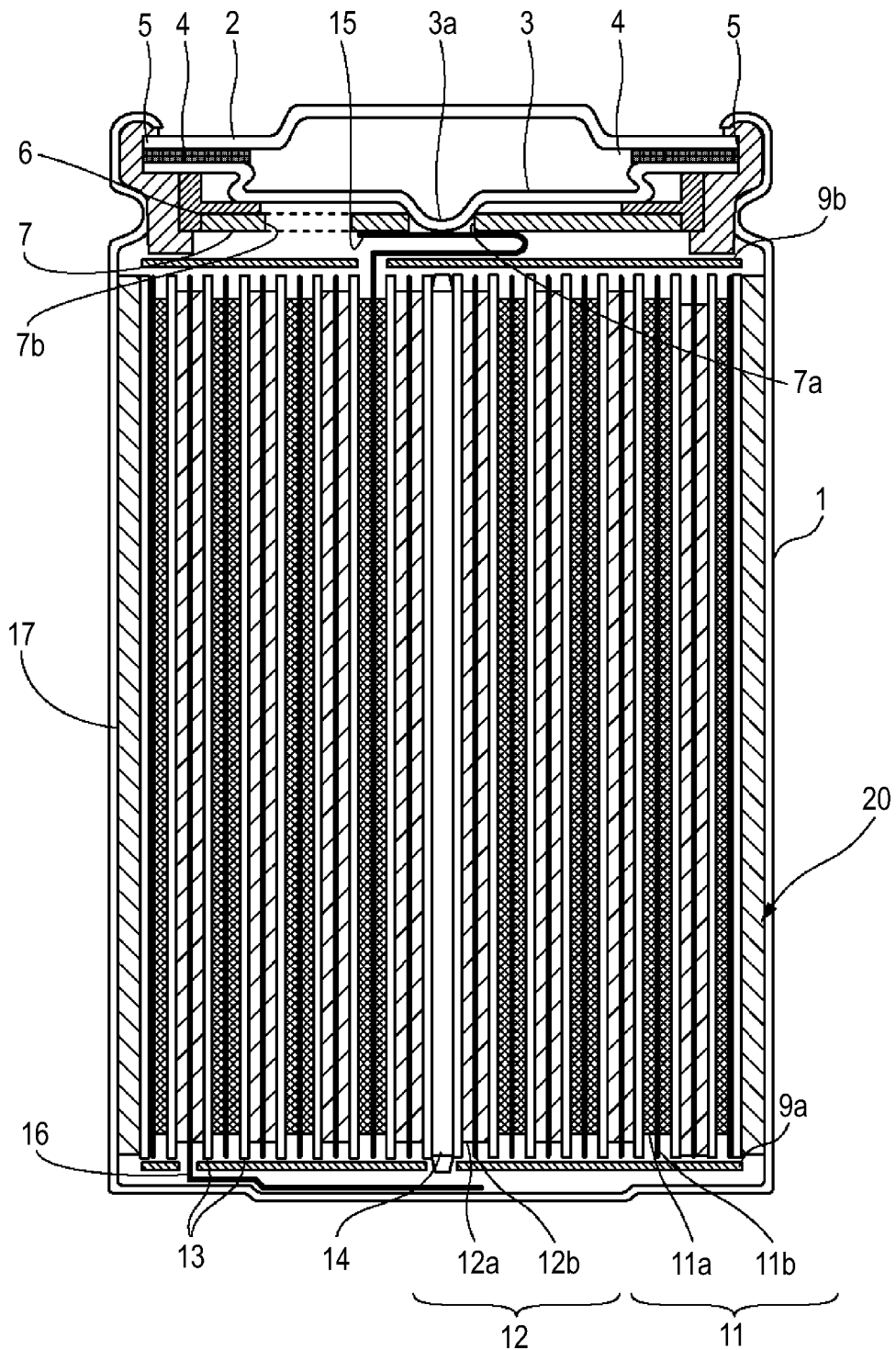
FIG. 2 is a cross sectional view illustrating an example of a configuration of the nonaqueous electrolyte battery according to the embodiment of the application.

FIG. 2 is a cross sectional view of a lithium ion secondary battery as an example of the cylindrical nonaqueous electrolyte battery of the embodiment. The secondary battery is of a so-called cylindrical type, and includes a wound electrode unit 20 disposed inside a substantially hollow cylindrical battery canister 1. The wound electrode unit 20 includes a belt-like positive electrode 11 and a belt-like negative electrode 12 wound around with a separator 13 in between, and the adhesive member 17 provided on the outer surface of the wound electrodes. The adhesive member 17 provided on the outer surface of the wound electrode unit 20 covers the positive electrode 11 and the negative electrode 12 at least at the terminating end portion of the roll.

The battery canister 1 is made of, for example, nickel-plated iron, and has a closed end and an open end. Inside the battery canister 1, a pair of insulating plates 9a and 9b is disposed on the both sides of the wound electrode unit 20, perpendicularly to the rolled surface.

The battery canister 1 may be made of material such as iron (Fe), nickel (Ni), stainless steel (SUS), aluminum (Al), and titanium (Ti). The battery canister 1 may be plated, using, for example, nickel, in order to prevent the electrochemical corrosion caused by the nonaqueous electrolytic solution due to the charge and discharge of the battery. A battery lid 2 (positive electrode terminal plate) is fastened to the open end portion of the battery canister 1 by swaging via an insulating sealing gasket 5, together with a safety valve mechanism and a PTC element (heat-sensitive resistive element: Positive Temperature Coefficient) 4 provided inside the battery lid 2.

The battery lid 2 is formed using, for example, the same or similar materials used for the battery canister 1, and includes an opening provided as a vent for releasing the gas generated inside the battery. The safety valve mechanism includes a safety valve 3, a disk holder 6, and a cutoff disk 7, stacked in order. The safety valve 3 has a protrusion 3a connected to a positive electrode terminal 15 of the wound electrode unit 20 through a hole 7a provided at the center of a cutoff disk 7. The safety valve mechanism is also electrically connected to the battery lid 2 via the PTC element 4.

The safety valve mechanism cuts off the electrical connection between the protrusion 3a, the battery lid 2, and the wound electrode unit 20 by the inversion of the safety valve 3, when the pressure inside the battery reaches a certain level as a result of battery internal shorting or external heat. Specifically, as the safety valve 3 inverts, the cutoff disk 7 pushes the positive electrode terminal 15, and disconnects the safety valve 3 from the positive electrode terminal 15. The disk holder 6 is made of insulating material, and accordingly the inversion of the safety valve 3 insulates the safety valve 3 from the cutoff disk 7.

In case of where the pressure inside the battery is further elevated by the generated gas inside the battery, a part of the safety valve 3 breaks apart to release the gas towards the battery lid 2 side.

For example, a plurality of gas vents 7b is provided around the hole 7a of the cutoff disk 7, allowing the generated gas from the wound electrode unit 20 to be effectively released towards the battery lid 2 side.

The PTC element 4 increases its resistance value under elevated temperatures, and cuts off the electrical connection between the battery lid 2 and the wound electrode unit 20, cutting the current and thus preventing abnormal heating due to overcurrent. The insulating sealing gasket 5 is formed using, for example, insulating material, and is asphalt-coated.

The wound electrode unit 20 housed inside the lithium ion secondary battery is wound around a center pin 14. The positive electrode 11 of the wound electrode unit 20 is connected to the positive electrode terminal 15, and the negative electrode 12 is connected to a negative electrode terminal 16. As described above, the positive electrode terminal 15 is electrically connected to the battery lid 2 by being welded to the safety valve 3. The negative electrode terminal 16 is electrically connected to the battery canister 1 by being welded thereto.

The configuration of the wound electrode unit 20 housed inside the battery canister 1 is described below.

Positive Electrode

The positive electrode 11 includes a positive electrode active material-containing positive electrode active material layer 11a formed on the both surfaces of a positive electrode collector 11b. The positive electrode collector 11b is formed using a metal foil, for example, such as an aluminum (Al) foil, a nickel (Ni) foil, and a stainless steel (SUS) foil.

The positive electrode active material layer 11a includes, for example, a conductive agent and a binder, in addition to the positive electrode active material. The material of the positive electrode active material may be a known positive electrode active material that can be used for doping and undoping with lithium ions. Metal oxides, metal sulfides, or specific polymers may be used depending on the type of the intended battery. For example, lithium-free metal sulfides or metal oxides, such as $TiS_2$, $MoS_2$, $NbSe_2$, and $V_2O_5$, or lithium composite oxide- or lithium-containing intercalation compounds of primarily $Li_xMO_2$ or $Li_xM_2O_4$ (where M is one or more transition metals, and x varies depending on the charge and discharge state of battery, generally $0.05 \leq x \leq 1.10$) can be used. The constituting transition metal is at least one selected from cobalt (Co), nickel (Ni), manganese (Mn), iron (Fe), aluminum (Al), vanadium (V), and titanium (Ti).

Specific examples of such lithium composite oxide include $LiCoO_2$, $LiNiO_2$, $LiNi_yCO_{1-y}O_2$ (where x and y vary depending on the charge and discharge state of battery, generally $0 < x \leq 1.2$, $0.7 < y < 1.02$), and $LiMn_2O_4$. The lithium composite oxide is particularly preferable, because, when used as the positive electrode active material, it can generate high voltage, and thus excels in energy density.

$Li_aMX_b$ (where M is a transition metal selected from the group presented above, X is selected from S, Se, and $PO_4$, and a and b are integers) also can be used.

More than one of the positive electrode active materials exemplified above may be used in combination as the positive electrode active material.

The conductive agent is not particularly limited, as long as it can impart conductivity by being mixed with the positive electrode active material in appropriate amounts. For example, carbon materials such as carbon black and graphite can be used. Known binders commonly used for the positive electrode mixture of this type of battery can be used as the binder. Preferably, fluorine-based resins such as polyvinyl fluoride, polyvinylidene fluoride, and polytetrafluoroethylene are used.

Material such as annealed aluminum (Al) is preferably used for the positive electrode collector 11b. Specific examples such aluminum (Al) material include JIS A3003P-0, JIS A8021P-O, and JIS A8079P-O. Annealing enables the positive electrode collector 11b to conform to the expansion and contraction of the positive electrode active material layer 11a, and thus prevents, for example, detachment or exfoliation of the positive electrode active material layer 11a.

The positive electrode terminal 15 is connected to one end portion of the positive electrode 11 by spot welding or ultrasonic welding. The positive electrode terminal 15 is preferably a metal foil or netted; however, the material is not necessarily required to be a metal, as long as it is electrochemically and chemically stable, and conductive. The material of the positive electrode terminal 15 is, for example, aluminum (Al). The positive electrode terminal 15 is connected to the positive electrode collector 11b in the exposed portion provided at the end portion of the positive electrode 11.

Negative Electrode

The negative electrode 12 includes a negative electrode active material-containing negative electrode active material layer 12a formed on the both surfaces of the negative electrode collector 12b. The negative electrode collector 12b is formed using a metal foil, for example, such as a copper foil, a nickel foil, and a stainless steel foil.

The negative electrode active material layer 12a may optionally include, for example, a conductive agent and a binder, in addition to the negative electrode active material. The material of the negative electrode active material may be carbon material, crystalline material, and amorphous metal oxide that can be used for doping and undoping with lithium. Specific examples of carbon material that can be used for doping and undoping with lithium include graphite, non-graphitizable carbon material, easily graphitizable carbon material, and high crystalline carbon material with a developed crystalline structure. More specific examples include carbon materials such as pyrolyzed carbons, cokes (pitch cokes, needle cokes, petroleum cokes), graphites, glass-like carbons, organic polymeric compound calcined products (carbonized products obtained by calcining phenol resin, furan resin, or the like at appropriate temperatures), carbon fibers, and activated carbon. Other examples include polymers such as polyacetylene.

Other examples of negative electrode active material include metals that can form an alloy with lithium, and alloy compounds of such metals. As used herein, the alloy compound is a compound represented by $M_pM'_qLi_r$, where M is a metallic element that can form an alloy with lithium, M' is one or more metallic elements other than an Li element or an M element, p is a number greater than 0, and q is a number equal to or greater than 0). In this embodiment of the application, the metallic element also encompasses semiconductor elements such as B, Si, and As. Specific examples include magnesium (Mg), boron (B), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), and alloy compounds thereof, specifically, for example, Li—Al, Li—Al-M (where M is one or more transition metal elements of Group 2A, 3B, and 4B), AlSb, and CuMgSb.

Of these elements, those containing the metallic elements belonging to Group 14 of the periodic table (long form), or containing semi-metallic elements as the constituting elements are preferable, and those containing at least one of silicon and tin as the constituting elements are particularly preferable. Silicon and tin are preferred because these elements are highly capable of storing and releasing lithium, and can thus provide high energy density. Specific examples include silicon, either alone or as an alloy or a compound, tin, either alone or as an alloy or a compound, and materials that at least partially include one or more phases of these.

Particularly preferred as the negative electrode material is CoSnC-containing material that contains tin, cobalt, and carbon (C) as the constituting elements, or FeSnC-containing material that contains tin, iron, and carbon as the constituting elements. These materials are preferred for their ability to provide high energy density and superior cycle characteristics. It is preferable that the CoSnC-containing material includes a tin-, cobalt-, and carbon-containing phase, and that this phase have a low-crystalline or amorphous structure. Similarly, it is preferable that the FeSnC-containing material includes a tin-, iron-, and carbon-containing phase, and that this phase has a low-crystalline or amorphous structure. Further, in the CoSnC-containing material and the FeSnC-containing material, it is preferable that the constituting element carbon at least partially binds to the other constituting elements, namely, metallic elements or semi-metallic elements. Bonding of the carbon with other elements suppresses agglomeration or crystallization of tin or other elements, which is considered to lower cycle characteristics. Note that the CoSnC-containing material and the FeSnC-containing material may also contain other constituting elements, as required.

The conductive agent is not particularly limited, as long as it can impart conductivity by being mixed with the negative electrode active material in appropriate amounts. For example, carbon materials such as carbon black and graphite can be used. Materials, for example, such as polyvinylidene fluoride and styrene-butadiene rubber are used as the binder.

A single negative electrode terminal 16 is connected to one end portion of the negative electrode 12 by spot welding or ultrasonic welding. The negative electrode terminal 16 is not necessarily required to be a metal, as long as it is electrochemically and chemically stable, and conductive. The material of the negative electrode terminal 16 may be, for example, copper (Cu) or nickel (Ni). As with the positive electrode terminal 15, the negative electrode terminal 16 is connected to the negative electrode collector 12b in the exposed portion provided at the end portion of the negative electrode 12.

Electrolyte

A nonaqueous electrolytic solution of an electrolyte salt dissolved in a nonaqueous solvent can be used as the electrolyte.

The nonaqueous electrolytic solution is adjusted by appropriately combining a nonaqueous solvent with an electrolyte salt. Any material commonly used for this type of battery can be used as the organic solvent. Preferred examples of nonaqueous solvent include propylene carbonate, ethylene carbonate, diethyl carbonate, dimethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolan, 4-methyl-1,3-dioxolan, diethyl ether, sulfolane, methylsulfolane, acetonitrile, propionitrile, anisole, acetate ester, butyrate ester, and propionate ester, which may be used either alone or in combinations of two or more.

The electrolyte salt is one that dissolves in the nonaqueous solvent, and includes a cation and an anion in combination. The cation may be an alkali metal or an alkali earth metal. The anion may be ions such as $Cl^-$, $Br^-$, $I^-$, $SCN^-$, $ClO_4^-$, $BF_4^-$, $PF_6^-$, and $CF_3SO_3^-$. Specific examples include LiCl, $LiClO_4$, $LiAsF_6$, $LiPF_6$, $LiBF_4$, $LiB(C_6H_5)_4$, LiBr, $CH_3SO_3L_1$, $CF_3SO_3Li$, and $N(CnF_{2n+1}SO_2)_2Li$, which may be used either alone or in combinations of two or more. Use of primarily $LiPF_6$ is preferred. The electrolyte salt concentration is not of concern, as long as the electrolyte salt can be dissolved in the nonaqueous solvent. The preferred lithium ion concentration ranges from 0.4 mol/kg to 2.0 mol/kg, inclusive, with respect to the nonaqueous solvent.

Provided that the adhesive member 17 can sufficiently expand, a gel electrolyte including the nonaqueous solvent and the electrolyte salt impregnated in a matrix polymer (organic polymer) may be used as the electrolyte, either alone or together with the nonaqueous electrolytic solution.

Various polymers can be used as the matrix polymer of the gel electrolyte, provided that the polymers gel by absorbing the nonaqueous electrolytic solution. Examples include fluoro polymers such as poly(vinylidene fluoride), and a copolymer of vinylidene fluoride and hexafluoropropylene; ether polymers such as poly(ethylene oxide) and its crosslinked products; and poly(acrylonitrile). For redox stability, use of fluoro polymers is particularly preferred. Inclusion of the electrolyte salt imparts ion conductivity.

Use of polymeric solid electrolytes that contain a conductive polymeric compound either alone or as a mixture, or gel electrolytes that contain a swelling solvent is also possible. Materials compatible with the electrolytic solution can be used as the conductive polymeric compound contained in the polymeric solid electrolyte and the gel electrolyte. Specific examples include a silicon gel, an acryl gel, an acrylonitrile gel, a polyphosphazene modified polymer, polyethylene oxide, polypropylene oxide, and a fluoro polymer, including a composite polymer, a crosslinked polymer, and a modified polymer of these. The fluoro polymer may be, for example, a polymer material such as poly(vinylidene fluoride), a copolymer of vinylidene fluoride and hexafluoropropylene, a copolymer of vinylidene fluoride and trifluoroethylene, and a copolymer of vinylidene fluoride and tetrafluoroethylene, and mixtures of these.

Separator

Preferably, the separator 13 is formed using, for example, a porous film of polyolefin-based material such as polypropylene (PP) and polyethylene (PE), or a porous film of inorganic material such as a ceramic nonwoven fabric. The separator 13 also may have a laminate structure of two or more of these porous films. Polypropylene porous films and polyethylene porous films are most effective.

Generally, the separator 13 has a thickness ranging from preferably 5 μm to 50 μm, inclusive, more preferably from 7 μm to 30 μm, inclusive. When the separator 13 is too thick, the active material can be filled only in small amounts, lowering battery capacity, ion conductivity, and thus current characteristics. When too thin, the mechanical strength of the film suffers.

(2) Cylindrical Nonaqueous Electrolyte Battery Manufacturing Method

A method for manufacturing the cylindrical nonaqueous electrolyte battery 10 of the embodiment of the application is described below.

Fabrication of Adhesive Member

The adhesive member 17 is fabricated by, for example, coating one of the surfaces of the base material 17A with adhesive material and forming the adhesive layer 17B. The base material 17A is obtained by cooling a sheet of the high-swelling resin material and the high-melting-point resin material that have been prepared by, for example, melting and kneading.

The method of the embodiment of the application forming the base material using a mixture of high-swelling resin material and high-melting-point resin material is advantageous over the method of forming the base material by copolymerizing high-swelling resin material and the high-melting-point resin material, in the following respects. First, because the method does not require large-scale facilities for the copolymerization of different materials, cost can be reduced, and the base material production process is easier. Another advantage is related to the compatibility of the materials used for copolymerization. While some copolymerizations may improve performance, other combinations may require additives or crosslinked products to prevent separation, requiring investigation. The method using a resin material mixture does not require such investigation, or addition of additives or other agents.

Fabrication of Battery Element

The fabrication begins with the positive electrode 11. The positive electrode active material, the binder, and the conductive agent are uniformly mixed to obtain a positive electrode mixture, which is then dispersed in a solvent, and optionally formed into a slurry using a ball mill, a sand mill, a biaxial kneader, or the like. The solvent is not particularly limited, as long as it is inert to the electrode material, and can dissolve the binder. The solvent may be an inorganic solvent or an organic solvent, and, for example, N-methyl-2-pyrrolidone (NMP) can be used. Note that the mixture ratio of the positive electrode active material, the conductive agent, the binder, and the solvent is not of concern, provided that these components are uniformly mixed. The slurry is then evenly coated over the both surfaces of the positive electrode collector 11b using, for example, a doctor blade method. The positive electrode active material layer 11a is formed upon removing the solvent by high-temperature drying. This completes the positive electrode 11.

The negative electrode 12 is fabricated next. The negative electrode active material, the binder, and the conductive agent are uniformly mixed to obtain a negative electrode mixture, which is then dispersed in a solvent to form a slurry. Here, a ball mill, a sand mill, a biaxial kneader, or the like may be used as with the case of the positive electrode mixture. The solvent is, for example, N-methyl-2-pyrrolidone, or methyl ethyl ketone. The mixture ratio of the negative electrode active material, the conductive agent, the binder, and the solvent is not of concern as with the case of the positive electrode active material. The slurry is then evenly coated over the both surfaces of the negative electrode collector 12b, using, for example, a doctor blade method. The negative electrode active material layer 12a is formed upon removing the solvent by high-temperature drying. This completes the negative electrode 12.

The coater is not particularly limited, and, for example, slide coating, an extrusion-type die coater, a reverse roller, a gravure, a knife coater, a kiss coater, a microgravure, a rod coater, and a blade coater can be used. The drying method is not limited either, and, for example, natural drying, a fan drier, a hot-air drier, an infrared heater, and a far-infrared heater can be used.

The positive electrode 11 and the negative electrode 12 fabricated as above are laminated in this order with the separator 13 in between. The laminate is wound, and the adhesive member 17 is attached to the outer surface of the wound electrode unit 20, covering the positive electrode 11 and the negative electrode 12 at the terminating end portion of the roll. Here, the adhesive member 17 is attached in a way that covers at least 10% of the outer surface of the wound electrode unit 20.

The wound electrode unit 20 with the adhesive member 17 attached to the outer surface is housed in the battery canister 1. The wound electrode unit 20 is designed so that its outer diameter is smaller than the inner diameter of the battery canister 1. Thus, the wound electrode unit 20 is easily housed into the battery canister 1. Here, the wound electrode unit 20 is housed in a way allowing the surface of the wound electrode unit 20 on the leading side of the negative electrode terminal 16 to be covered with the insulating plate 9a formed of insulating resin. This is followed by resistance welding using an electrode rod inserted from the center of the battery element roll, and another electrode rod disposed on the outer side of the bottom of the battery canister. As a result, the negative electrode terminal 16 is welded to the battery canister 1.

After the negative electrode terminal 16 is welded to the battery canister 1, the center pin 14 is inserted, and the insulating plate 9b is disposed on the surface portion of the roll on the open end side of the battery canister 1, before injecting the electrolytic solution. The safety valve mechanism and the PTC element 4 are then provided inside the battery lid 2 that includes an opening 24, and a thin-wall portion 25 or a groove 26, and the positive electrode terminal 15 is connected to the safety valve 3. The battery lid 2 is then fastened by swaging via the insulating sealing gasket 5, sealing the battery canister 1.

For reasons related to manufacturing steps, the positive electrode terminal 15 needs to have a certain length. Specifically, this is because the open end portion of the battery canister 1 is closed after the positive electrode terminal 15 is connected in advance to the safety valve 3 provided on the battery lid 2. As such, it becomes successively difficult to connect the positive electrode terminal 15 to the safety valve 3 as the positive electrode terminal 15 becomes shorter. Thus, the positive electrode terminal 15 of a certain length is housed in the battery canister 1 by being bent in the shape of substantially the letter U inside the battery.

The adhesive member 17 starts absorbing the electrolytic solution as soon as the electrolytic solution injected into the battery canister 1. By absorbing the electrolytic solution, the adhesive member 17 expands in the space created by the clearance between the outer diameter of the wound electrode unit 20 and the inner diameter of the battery canister 1, thereby anchoring the wound electrode unit 20 inside the battery canister 1.

In the cylindrical nonaqueous electrolyte battery fabricated as above, the positive electrode collector 11b and the negative electrode collector 12b are not easily damaged or fractured, and damage to the connected portion of the positive electrode collector 11b and the negative electrode collector 12b also can be suppressed. Thus, a high-quality cylindrical nonaqueous electrolyte battery can be obtained that has high safety, and can suppress lowering of battery capacity and cycle characteristics.

EXAMPLES

The embodiment of the application is specifically described below based on Examples. Note, however, that the application is not limited by the following Examples.

Example 1

Fabrication of Positive Electrode

First, 94 weight % of the positive electrode active material lithium-cobalt-nickel composite oxide ($LiCo_{0.5}Ni_{0.5}O_2$), 3 weight % of the conductive agent graphite, and 3 weight % of the binder polyvinylidene fluoride (PVdF) were uniformly mixed to prepare a positive electrode mixture. The positive electrode mixture was then dispersed in the solvent N-methyl-2-pyrrolidone to obtain a positive electrode mixture slurry. The positive electrode mixture slurry was evenly coated over the both surfaces of a 15 µm-thick aluminum (Al) foil (positive electrode collector), and the whole was dried under reduced pressure at 100° C. for 24 hours, and press molded using a roller press machine to form a positive electrode active material layer. An annealed aluminum foil (JIS A3003P-O) was used as the positive electrode collector.

Fabrication of Negative Electrode

Ninety weight % of a pulverized artificial graphite powder (negative electrode active material), and ten weight % of the binder polyvinylidene fluoride (PVdF) were uniformly mixed to prepare a negative electrode mixture. The negative electrode mixture was then dispersed in the solvent N-methyl-2-pyrrolidone to obtain a negative electrode mixture slurry. The negative electrode mixture slurry was evenly coated over the both surfaces of a 15 µm-thick copper (Cu) foil (negative electrode collector), and the whole was dried under reduced pressure at 100° C. for 24 hours, and press molded using a roller press machine to form a negative electrode active material layer. A nickel (Ni) negative electrode terminal was connected to one end portion of the negative electrode.

Fabrication of Adhesive Member

Ninety weight % of polyvinylidene fluoride (PVdF; high-swelling resin material), and ten weight % of polyethylene terephthalate (PET; high-melting-point resin material) were melted, kneaded, and formed into a sheet, which was then dried to obtain a base material having a thickness of 40 µm. Thereafter, an acrylic acid ester copolymer was melted, and coated over one surface of the base material to form a 10 µm-thick adhesive layer, and obtain an adhesive member.

The base material fabricated as above was punched to obtain a base material piece measuring 20 mm in diameter. The base material piece was dipped into a 45° C. polycarbonate (PC), and an amount of mass increase was determined after 24 hours. The percentage mass change after dipping the base material piece was calculated to be 25% with respect to the mass before dipping.

Adjustment of Electrolytic Solution

Electrolyte solution was obtained by dissolving the electrolyte salt lithium hexafluorophosphate (LiPF$_6$) in a content of 1.0 mol/l in a mixed solvent that contained ethylene carbonate (EC) and diethyl carbonate (DEC) in an equal mass ratio.

Assemble of Wound Electrode Unit

A separator was prepared from a microporous polypropylene film. The positive electrode, the separator, the negative electrode, and the separator were laminated in this order, and wound multiple times into a coil. Then, an adhesive member formed into the shape that covers 100% of the outer surface of the roll was attached over the outer surface of the roll. This completed the wound electrode unit. The adhesive member covered the positive electrode and the negative electrode at the terminating end portion of the roll. The wound electrode unit was then housed in a battery canister with an insulating plate disposed to cover the surface on the bottom side of the roll. Then, the negative electrode terminal leading out from the wound electrode unit was bonded to the bottom of the battery canister. The negative electrode terminal was welded to the bottom of the battery canister, using a welder inserted from the space at the center of the wound electrode unit, and a welder contacted to the battery canister from outside.

Thereafter, a center pin was inserted at the center of the wound electrode unit, and, after disposing an insulating plate over the surface on the upper side of the roll, an electrolytic solution was injected into the battery canister housing the wound electrode unit. The positive electrode terminal leading out from the wound electrode unit was then connected to the cutoff disk of the safety valve mechanism bonded to the battery lid, and that included the PTC element, the safety valve, the disk holder, and the cutoff disk. Finally, the battery lid including the safety valve mechanism connected to the positive electrode terminal was fastened by swaging to the open end portion of the battery canister via the insulating sealing gasket. This completed a test battery of the size ICR18650 described in JIS C8711.

Example 2

A test battery was fabricated as in Example 1, except that a mixture of 10 weight % polyvinylidene fluoride (PVdF) and 90 weight % polyethylene terephthalate (PET) was used as the base material of the adhesive member. The percentage mass change after dipping the base material piece, calculated in the same manner as in Example 1 was 14% with respect to the mass before dipping.

Example 3

A test battery was fabricated as in Example 1, except that a mixture of 97 weight % polyvinylidene fluoride (PVdF) and 3 weight % polyethylene terephthalate (PET) was used as the base material of the adhesive member. The percentage mass change after dipping the base material piece, calculated in the same manner as in Example 1 was 27% with respect to the mass before dipping.

Example 4

A test battery was fabricated as in Example 1, except that a mixture of 90 weight % polyvinylidene fluoride (PVdF) and 10 weight % polyethylene (PE) was used as the base material of the adhesive member. The percentage mass change after dipping the base material piece, calculated in the same manner as in Example 1 was 22% with respect to the mass before dipping.

Example 5

A test battery was fabricated as in Example 1, except that a mixture of 90 weight % tetrafluoroethylene-ethylene copolymer (ETFE) and 10 weight % polyethylene (PE) was used as the base material of the adhesive member. The percentage mass change after dipping the base material piece, calculated in the same manner as in Example 1 was 20% with respect to the mass before dipping.

Example 6

A test battery was fabricated as in Example 1, except that the adhesive member covered 10% of the outer surface area of the wound electrode unit. The area covered by the adhesive member included the terminating end portion of the roll of the positive electrode and the negative electrode. The percentage mass change after dipping the base material piece, calculated in the same manner as in Example 1 was 25% with respect to the mass before dipping.

Example 7

A test battery was fabricated as in Example 1, except that the adhesive member covered 20% of the outer surface area of the wound electrode unit. The area covered by the adhesive member included the terminating end portion of the roll of the positive electrode and the negative electrode. The percentage mass change after dipping the base material piece, calculated in the same manner as in Example 1 was 25% with respect to the mass before dipping.

Comparative Example 1

A test battery was fabricated as in Example 1, except that a mixture of 5 weight % polyvinylidene fluoride (PVdF) and 95 weight % polyethylene terephthalate (PET) was used as the base material of the adhesive member. The percentage mass change after dipping the base material piece, calculated in the same manner as in Example 1 was 10% with respect to the mass before dipping.

Comparative Example 2

A test battery was fabricated as in Example 1, except that polyvinylidene fluoride (PVdF) was used alone as the base material of the adhesive member. The percentage mass change after dipping the base material piece, calculated in the same manner as in Example 1 was 29% with respect to the mass before dipping.

Comparative Example 3

A test battery was fabricated as in Example 1, except that polypropylene (PP) was used alone as the base material of the adhesive member. The percentage mass change after dipping the base material piece, calculated in the same manner as in Example 1 was 0% with respect to the mass before dipping.

Comparative Example 4

A test battery was fabricated as in Example 1, except that polyvinylidene fluoride (PVdF) and polyethylene terephthalate (PET) were laminated, and that the adhesive layer was provided on the polyethylene terephthalate (PET) surface to provide the base material of the adhesive member. The percentage mass change after dipping the base material piece, calculated in the same manner as in Example 1 was 28% with respect to the mass before dipping.

Comparative Example 5

A test battery was fabricated as in Example 1, except that the adhesive member covered 5% of the outer surface area of the wound electrode unit. The area covered by the adhesive member included the terminating end portion of the roll of the positive electrode and the negative electrode. The percentage mass change after dipping the base material piece, calculated in the same manner as in Example 1 was 25% with respect to the mass before dipping.

Battery Evaluation

The test batteries were evaluated as follows.

(a) Vibrational Impact Resistance Test

The internal resistance and voltage of each test battery were measured using AX-1242N (ADEX). Subsequently, each test battery was repeatedly dropped 100 times from a height of 1.2 m. Here, the test battery was dropped to land on the bottom of the battery. The internal resistance and voltage of each test battery were measured again using AX-1242N (ADEX), and the percentage increase of cell resistance of each tested battery was measured. Note that the measurement device was used under the condition of 1 kHz±0.1% sinusoidal waveform, and the applied voltage of 1 V r.m.s (root mean square).

The batteries were disassembled after the measurement of cell resistance, and the presence or absence of damage at the welded portion of the positive electrode terminal and the negative electrode terminal, and the presence or absence of damage in the positive electrode terminal were checked by visual inspection.

(b) Heat Resistance Test

Each test battery was placed in a 110° C. constant-temperature bath for 15 hours, and the adhesive member was removed after disassembling the battery. The vertical and horizontal dimensions of the adhesive member were measured, and the rate of thermal shrinkage with respect to the adhesive member before testing was determined.

Note that the temperature (110° C.) of the constant-temperature bath was chosen to be in excess of the battery internal temperature reached during the large current discharge cycle.

(c) Handling Test

The delamination strength between the base material and the adhesive layer of the adhesive member used for each test battery was measured. The test evaluates whether the adhesive member is appropriate as an adhesive material that bonds the terminating end portions of the electrodes in the wound electrode unit, by checking for any delamination after pulling the adhesive member.

Measurements in the test were based on the 180° rip-off adhesion according to the adhesive tape-adhesive sheet testing method specified in JIS Z0237. Further, a tensile tester (detachment tester) according to JIS B7721 was used for the measurement, and a constant-speed tensional autograph TCE-N300 (Shimadzu Corporation) was used for the evaluation.

(d) Electrolytic Solution Resistance Test

The test checked for any detachment caused by entry of the solvent between the layers after dipping the adhesive member in the electrolytic solution, and evaluated whether the adhesive member was appropriate as the adhesive material that bonds the terminating end portions of the electrodes in the wound electrode unit.

In this test, the adhesive member used in each Example and Comparative Example was punched to obtain a test piece measuring 20 mm in diameter, and the presence or absence of detachment between the base material and the adhesive layer was visually checked after the test piece was dipped in 23° C. dimethyl carbonate (DMC) for 3 days.

The evaluation results are presented in Table 1 below.

TABLE 1

| | | Base material | | | |
|---|---|---|---|---|---|
| | | (A) High-swelling resin material | (B) High-melting-point resin material | Form | Mixture weight ratio A:B | Base material's degree of swellability [%] |
| EX. 1 | | PVdF | PET | Mixture | 90:10 | 25 |
| EX. 2 | | PVdF | PET | Mixture | 10:90 | 14 |

TABLE 1-continued

| | | | | | |
|---|---|---|---|---|---|
| EX. 3 | PVdF | PET | Mixture | 97:3 | 27 |
| EX. 4 | PVdF | PE | Mixture | 90:10 | 22 |
| EX. 5 | ETFE | PE | Mixture | 90:10 | 20 |
| EX. 6 | PVdF | PET | Mixture | 90:10 | 25 |
| EX. 7 | PVdF | PET | Mixture | 90:10 | 25 |
| Com. Ex. 1 | PVdF | PET | Mixture | 5:95 | 4 |
| Com. Ex. 2 | PVdF | — | Alone | — | 29 |
| Com. Ex. 3 | — | PP | Alone | — | 0 |
| Com. Ex. 4 | PVdF | PET | Laminate | — | 28 |
| Com. Ex. 5 | PVdF | PET | Mixture | 90:10 | 25 |

| | | Vibrational impact resistance test | | Heat resistance test | | Electrolytic solution resistance |
|---|---|---|---|---|---|---|
| | Percentage area coverage [%] | Percentage cell resistance increase [%] | Damage | Rate of thermal shrinkage of adhesive member [%] | Handling test Delamination strength [N/10 mm] | test Presence or absence of delamination |
| EX. 1 | 100 | 1 | None | 6 | 1.5 | Absent |
| EX. 2 | 100 | 6 | None | 4 | 1.3 | Absent |
| EX. 3 | 100 | 0.7 | None | 10 | 1.7 | Absent |
| EX. 4 | 100 | 2 | None | 25 | 1.5 | Absent |
| EX. 5 | 100 | 3 | None | 6 | 1.0 | Absent |
| EX. 6 | 10 | 9 | None | 6 | 1.5 | Absent |
| EX. 7 | 20 | 7 | None | 6 | 1.5 | Absent |
| Com. Ex. 1 | 100 | 60 | Present | 3 | 1.4 | Absent |
| Com. Ex. 2 | 100 | 0.4 | None | 40 | 1.0 | Absent |
| Com. Ex. 3 | 100 | 90 | Present | 0 | 1.4 | Absent |
| Com. Ex. 4 | 100 | 0.4 | None | 4 | 0.07 | Present |
| Com. Ex. 5 | 5 | 80 | Present | 6 | 1.5 | Absent |

Vibrational Impact Resistance Test Results

As can be seen from Table 1, there was no damage at the connected portion of the electrode terminals or in the positive electrode terminal itself, and the percentage increase of cell resistance before and after the vibrational impact resistance test was as low as 10% or less in Examples 1 to 7 and Comparative Examples 2 and 4 in which the base material had a high degree of swelling, and in which the adhesive member had a coverage area of 10% or more. In contrast, there was damage at the connected portion of the electrode terminals or in the positive electrode terminal itself, and the percentage increase of cell resistance before and after the vibrational impact resistance test was considerably high in Comparative Examples 1 and 3 in which the base material had a low degree of swelling, and in Comparative Example 5 in which the base material had a high degree of swelling, but the adhesive member had the low coverage area of 5%.

These results indicate that the wound electrode unit undergoes large vibrations in response to vibrational impact when the base material has a low degree of swelling, or when the adhesive member is too small for the battery clearance despite a high degree of swelling in the base material.

Heat Resistance Test Results

The adhesive member had a low rate of thermal shrinkage, and an excellent heat resistance property in Examples 1 to 7 and Comparative Examples 1 and 5 in which the mixture ratio of the high-swelling resin material and the high-melting-point resin material was within the range of the present application. Further, as is clear from the results of Examples 1 and 4, the heat resistance was found to increase as the melting point of the resin mixed as the high-melting-point resin material was increased.

It was also found that the high-melting-point resin material performs to increase heat resistance, as can be seen from the results of Comparative Example 3 in which only the high-melting-point resin material was used as the base material, and in Comparative Example 4 in which a laminate of high-swelling resin material and high-melting-point resin material was used as the base material.

In contrast, in Comparative Example 2 in which the high-melting-point resin material was not contained, the rate of thermal shrinkage of the adhesive member before and after the heat resistance test was considerably high, and the adhesive member failed to retain its shape in the heat generated inside the battery. The failure to retain shape is considered to be due to the very thin thickness and the large surface area of the polyvinylidene fluoride (PVdF) used as the adhesive member for the wound electrode unit, making the PVdF susceptible to heat damage despite the melting point of about 140° C.

Handling Test Results and Electrolytic Solution Resistance Test Results

As is clear from Table 1, the adhesive member had good handling with the delamination strengths of 1.0 N/10 mm and higher in Examples 1 to 7 and Comparative Examples 1 and 5 in which a mixture of high-swelling resin material and high-melting-point resin material was used as the base material. High delamination strengths were also obtained in Comparative Examples 2 and 3 in which only one of the high-swelling resin material and the high-melting-point resin material was used as the base material.

In contrast, handling was poor with the considerably low delamination strength of 0.07 N/10 mm in Comparative Example 4 in which the laminate of high-swelling resin material and high-melting-point resin material was used as the base material. It was also found that an adhesive member with a low delamination strength as in Comparative Example 4 cannot serve as the adhesive member, because such adhesive members have a poor electrolytic solution resistance property, and are likely to undergo delamination in the electrolytic solution.

Such delamination in the laminate of high-swelling resin material and high-melting-point resin material is probably due to the laminated base material structure held together only by physical bonding in the absence of interlayer chemical bonding, causing delamination when the adhesion of the adhesive layer is greater than the interlayer adhesion. Supposedly, this is followed by entry of the electrolytic solution through the detached portion, leading to the complete separation of the base material from the adhesive layer.

It was found from the test results that the nonaqueous electrolyte battery in which the adhesive member as the laminate of the adhesive layer and the base material that is a mixture of high-swelling resin material and high-melting-point resin material covers at least 10% of the outer surface area of the wound electrode unit has strong resistance to external vibrations because of the anchored wound electrode unit, and excels in heat resistance and electrolytic solution resistance.

The application has been specifically described with respect to a certain embodiment. However, the application is not limited to the foregoing embodiment, and various modifications are possible based on the technical ideas of the application.

For example, use of the adhesive member is not limited to the cylindrical nonaqueous electrolyte battery, and the adhesive member is also usable for other types of batteries, including rectangular batteries. Further, the adhesive member is applicable to all kinds of battery systems that have the problem of vibration not only in the wound electrode unit but in other electrode units (power-generating elements). Further, the adhesive member can be suitably used for both primary and secondary batteries.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A cylindrical nonaqueous electrolyte secondary battery comprising:
    a wound electrode unit as a wound electrode laminate of a belt shaped positive electrode and a belt shaped negative electrode laminated via a separator, the positive electrode including a positive electrode collector and a positive electrode active material layer formed on the positive electrode collector, and the negative electrode including a negative electrode collector and a negative electrode active material layer formed on the negative electrode collector;
    an adhesive member provided to cover the wound electrode laminate at a terminating end portion that lies on an outer side of the wound electrode unit; and
    a battery canister that houses the wound electrode unit,
    the adhesive member including a base material, and an adhesive layer provided on a whole surface or on at least a part of the surface on one side of the base material, and
    the base material being a mixture of a resin material of high swellability and a resin material of high melting point,
    wherein of the base material the resin material of high swellability is tetrafluoroethylene-ethylene copolymer and included at 90 wt %, and the resin material of high melting point is polyethylene included at 10 wt %.

2. The battery according to claim 1,
    wherein the resin material of high swellability has a degree of swelling of 5% or more after being dipped in propylene carbonate, and
    wherein the resin material of high melting point has a melting point of 60° C. or more.

3. The battery according to claim 1, wherein the adhesive member covers at least 10% of the whole area of the outer surface of the wound electrode unit.

4. The battery according to claim 3, wherein the adhesive layer is formed of an acrylic adhesive, a rubber-based adhesive, a silicone-based adhesive, a urethane-based adhesive, an α-olefin-based adhesive, an ether-based adhesive, an ethylene-vinyl acetate resin-based adhesive, an epoxy resin-based adhesive, a vinyl chloride resin-based adhesive, a chloroprene rubber-based adhesive, a cyanoacrylate-based adhesive, an aqueous polymer-isocyanate-based adhesive, a styrene-butadiene rubber-based adhesive, a nitrile rubber-based adhesive, a nitrocellulose-based adhesive, a reactive hotmelt-based adhesive, a phenol resin-based adhesive, a modified silicone-based adhesive, a polyamide resin-based adhesive, a polyimide-based adhesive, a polyurethane resin-based adhesive, a polyolefin resin-based adhesive, a polyvinyl acetate resin-based adhesive, a polystyrene resin solvent-based adhesive, a polyvinyl alcohol -based adhesive, a polyvinyl pyrrolidone resin-based adhesive, a polyvinyl butyral resin-based adhesive, a polybenzimidazole-based adhesive, a polymethacrylate resin-based adhesive, a melamine resin-based adhesive, a urea resin-based adhesive, or a resorcinol-based adhesive.

5. The battery according to claim 1, wherein the resin material of high swellability has a degree of swelling of at least 11% with respect to propylene carbonate.

6. The battery according to claim 1, wherein the adhesive layer has a delamination strength of at least 0.1 N/mm with respect to the base material.

7. The battery according to claim 1, wherein the adhesive member is provided over a distance substantially equal to a height of the wound electrode unit.

8. The battery according to claim 1, wherein the adhesive member covers at least 10% of the whole area of the outer surface of the wound electrode unit at an end portion of the electrode laminate.

9. The battery according to claim 1, further comprising an electrolyte.

10. The battery according to claim 9, wherein the electrolyte includes a gel electrolyte including at least one of a nonaqueous solvent and an electrolyte salt impregnated in an organic matrix polymer.

11. The battery according to claim 10, wherein the organic matrix polymer of the gel electrolyte is selected from the group consisting of poly(vinylidene fluoride), a copolymer of vinylidene fluoride and hexafluoropropylene, poly(ethylene oxide), and poly(acrylonitrile).

12. The battery according to claim 9, wherein the electrolyte is selected from the group consisting of polymeric solid electrolytes that contain a conductive polymeric compound, and gel electrolytes that contain a swelling solvent.

13. The battery according to claim 12, wherein the conductive polymeric compound is selected from the group consisting of a silicon gel, an acryl gel, an acrylonitrile gel, a polyphosphazene modified polymer, polyethylene oxide, polypropylene oxide, a fluoro polymer.

14. The battery according to claim 13, wherein fluoro polymer is at least one selected from the group consisting of poly(vinylidene fluoride), a copolymer of vinylidene fluoride and hexafluoropropylene, a copolymer of vinylidene fluoride and trifluoroethylene, and a copolymer of vinylidene fluoride and tetrafluoroethylene.

* * * * *